United States Patent
Yoshida et al.

(10) Patent No.: US 6,641,311 B2
(45) Date of Patent: Nov. 4, 2003

(54) CAMERA, AND METHOD OF OPENING AND CLOSING A LENS

(75) Inventors: Koji Yoshida, Tokyo (JP); Hiroyuki Iwasaki, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/230,109

(22) Filed: Aug. 29, 2002

(65) Prior Publication Data

US 2003/0044182 A1 Mar. 6, 2003

(30) Foreign Application Priority Data

Sep. 3, 2001 (JP) ........................................ 2001-265784

(51) Int. Cl.$^7$ .............................................. G03B 17/02
(52) U.S. Cl. ...................................... 396/448; 396/543
(58) Field of Search ................................. 396/448, 535, 396/543

(56) References Cited

U.S. PATENT DOCUMENTS

| | | | | |
|---|---|---|---|---|
| 4,283,132 A | * | 8/1981 | Engelsmann et al. | 396/448 |
| 5,913,089 A | * | 6/1999 | Ebe | 396/448 |
| 6,322,259 B1 | * | 11/2001 | Miyamoto et al. | 396/448 |
| 6,347,893 B1 | * | 2/2002 | Shiono et al. | 396/448 |
| 6,491,448 B2 | * | 12/2002 | Tanaka | 396/348 |

* cited by examiner

*Primary Examiner*—Russell Adams
*Assistant Examiner*—Michael Dalakis
(74) *Attorney, Agent, or Firm*—Young & Thompson

(57) ABSTRACT

A camera includes a rigid cover formed by an integrated front cover and side cover, with the rigid cover being slidable in a transverse direction (a side direction). A lens aperture is formed in the rigid cover. A lens barrier that openings and closes the lens aperture due to the lens barrier being moved interlockingly with a sliding movement of the rigid cover is formed at a front side of a camera body. When the rigid cover is reciprocated in a state in which the lens aperture is closed, the lens aperture is opened by the lens barrier moving. When the rigid cover is reciprocated in a state in which the lens aperture is opened, the lens aperture is closed by the lens barrier moving.

17 Claims, 20 Drawing Sheets

CAMERA, AND METHOD OF OPENING AND CLOSING A LENS

BACKGROUND OF THE INVENTION

1. Field of the Invention

The present invention relates to a camera that opens and closes a lens aperture and a method of opening and closing a lens.

2. Description of the Related Art

There is an escalating trend to improve miniature cameras by, improving the ease with which they can be carried and operated for shooting. Barrier-free miniature cameras have thus been developed for the purpose of miniaturizing and lightening cameras.

At the same time, there has also been a demand for lens barriers to be disposed in miniature cameras in order to sufficiently protect the lens, and for the operation by which the lens barriers are opened and closed to be easy. Moreover, there has been the desire for such miniature cameras to also have an appealing design.

SUMMARY OF THE INVENTION

In consideration of the above facts, it is an object of the present invention to provide a camera that opens and closes a lens aperture.

A first aspect of the invention is a camera comprising: a front cover that is disposed at a lens-mounted side of the camera, so as to be slidable with respect to a camera body mounted with the lens, and includes a lens aperture which exposes the lens; a lens barrier which opens and closes the lens aperture; and an opening/closing mechanism which moves the lens barrier interlockingly with a sliding movement of the front cover so that the lens aperture is opened and closed with the lens barrier due to the lens barrier being moved.

Thus, because the lens aperture can be opened and closed by sliding the front cover, it becomes unnecessary to dispose on the camera body switches or buttons for opening and closing the lens aperture. It should be noted that the diameter of the lens aperture is generally larger than the outside diameter of a lens barrel housed in the camera body.

In a second aspect of the invention, the mechanism comprises a switching mechanism which switches opening and closure of the lens aperture by the lens barrier per reciprocal movement of the front cover.

Thus, when the front cover is reciprocated in a state in which the lens aperture is closed, the lens aperture is opened by the lens barrier moving, and when the front cover is reciprocated in a state in which the lens aperture is opened, the lens aperture is closed by the lens barrier moving. Accordingly, it is possible to open and close the lens aperture in a state in which the front cover has returned to a constant position prior to being slid.

In a third aspect of the invention, the lens barrier is rotatably disposed at a front side of the camera body and rotates interlockingly with a sliding movement of the front cover in one direction.

Thus, it becomes possible to simplify the switching mechanism.

In a fourth aspect of the invention, an urging member which urges the front cover in a constant direction is disposed.

Thus, because the front cover returns of its own accord to its former position when the front cover is gripped, slid, and released, operation for reciprocating the front cover becomes remarkably simple.

In a fifth aspect of the invention, the diameter of the lens aperture is larger than an outside diameter of a lens barrel housed in the camera body.

Thus, it is possible to magnify a subject with a zoom or varifocal lens and shoot the subject.

In a sixth aspect of the invention, the front cover is slidable in a side direction relative to the camera body.

Thus, because it is easy to slide the front cover with a finger, the ease with which the camera can be operated is improved.

In a seventh aspect of the invention, a side cover having a side that is integrally formed with the front cover is disposed so as to form a substantially L-shaped cover when the camera is viewed from above.

Thus, the front cover can be slid by gripping the side cover and sliding the front cover. Moreover, the design of the camera remains aesthetically pleasing even when the front cover has been slid.

In an eighth aspect of the invention, a recess, into which a finger can be placed when the substantially L-shaped cover is slid, is formed in the camera body, and the finger catches the substantially L-shaped cover when the finger is placed in the recess.

Thus, the side cover is easy to grip when the front cover is to be slid.

As described above, a miniature camera in which a lens aperture can be opened and closed by simply sliding a lens barrier and that has an excellent design is realized with the invention.

DESCRIPTION OF THE PREFERRED EMBODIMENTS

Figure 1A:
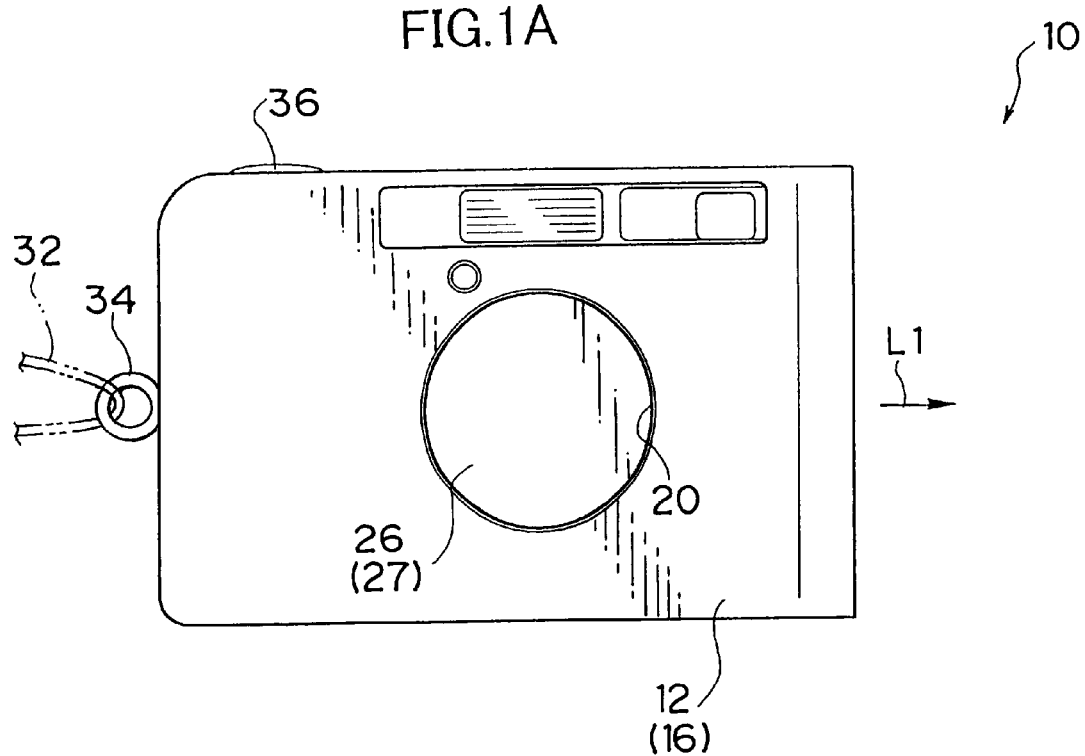
FIG. 1A is a front view of a camera according to a first embodiment of the invention.
Figure 1B:
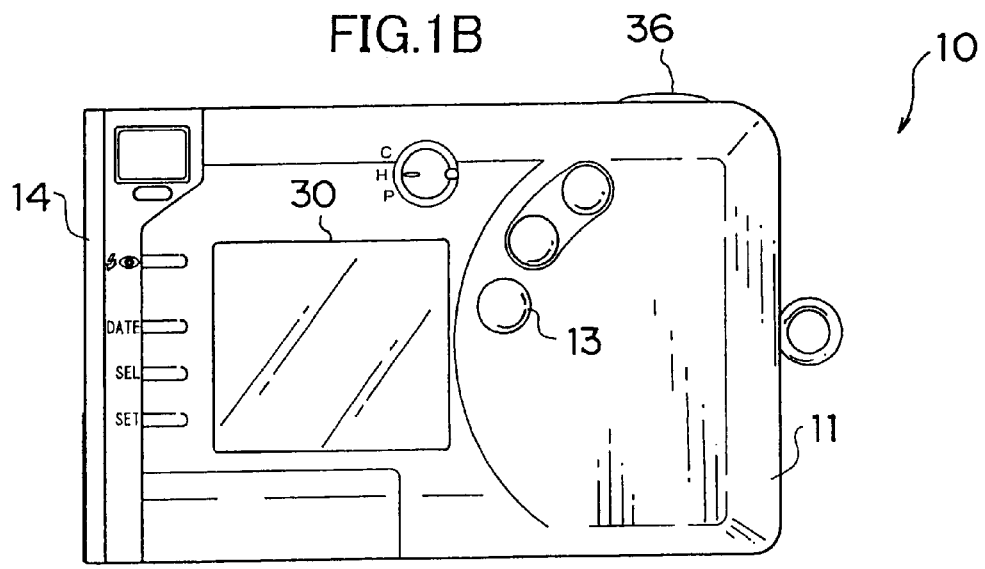
FIG. 1B is a rear view of the camera.

Embodiments of the present invention will be described below with reference to the attached drawings.

First Embodiment

FIGS. 1 through 7 illustrate a camera 10 according to a first embodiment of the invention. The camera 10 is disposed with a front cover 12 on a front of the camera 10. The front cover 12 is slidable in a transverse direction (side direction) with respect to a camera body 11. The front cover 12 is integrally manufactured with a side cover 14 disposed on a side of the camera 10. Thus, a rigid cover 16 that has a substantial L-shape when seen from above the camera 10 is formed at the camera body 11 (see FIG. 5B).

A lens aperture 20 for exposing a lens 19 is formed in the rigid cover 16. The diameter of the lens aperture 20 is larger than the outside diameter of a lens barrel 24 housed in the camera body 11 (see FIGS. 3 to 5D).

A lens barrier 26 that interlocks with sliding of the rigid cover 16 to open and close the lens aperture 20 is disposed on the front of the camera body 11.

Figure 5A:
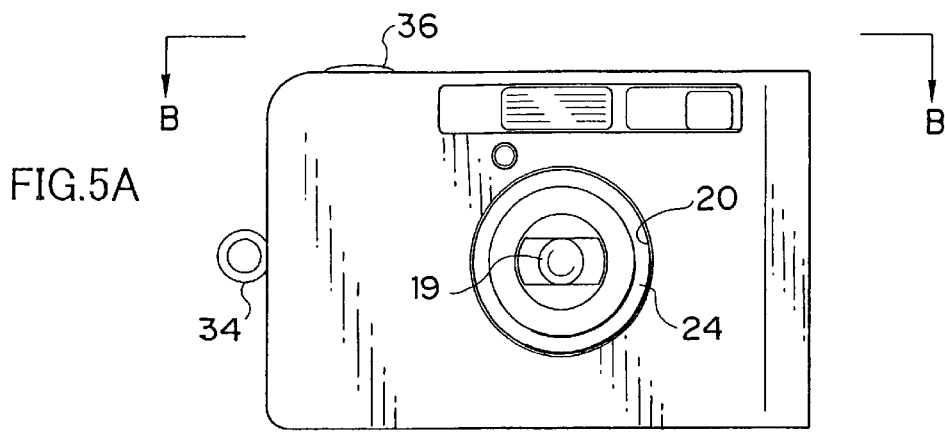
FIG. 5A is a front view of a zoom lens extending from the state shown in FIG. 4.
Figure 5B:
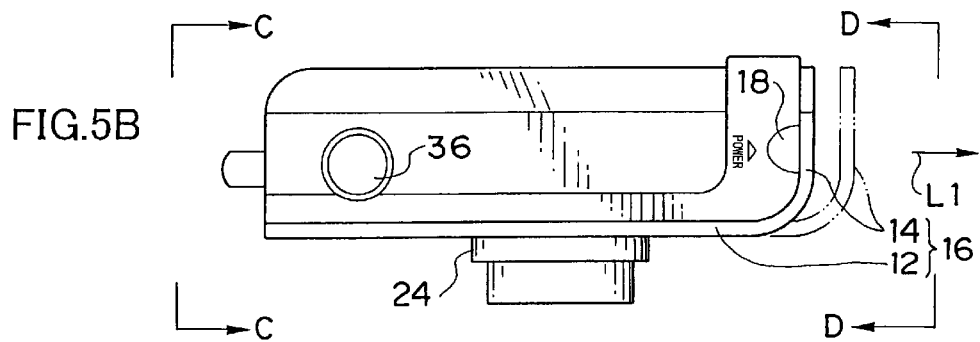
FIG. 5B is a plan view seen from arrows B—B.
Figure 5C:
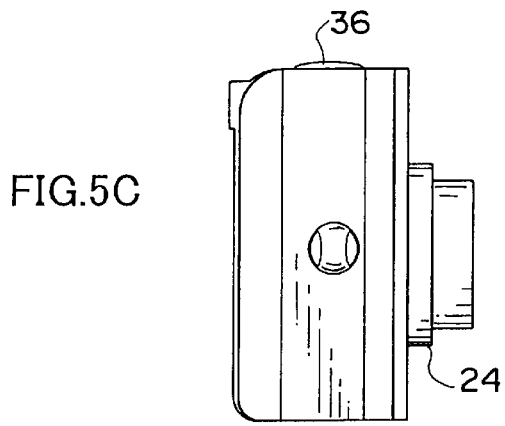
FIG. 5C is a side view seen from arrows C—C.
Figure 5D:
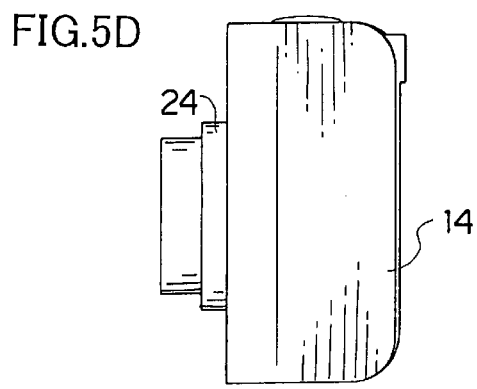
FIG. 5D is a side view seen from arrows D—D.
Figure 6:
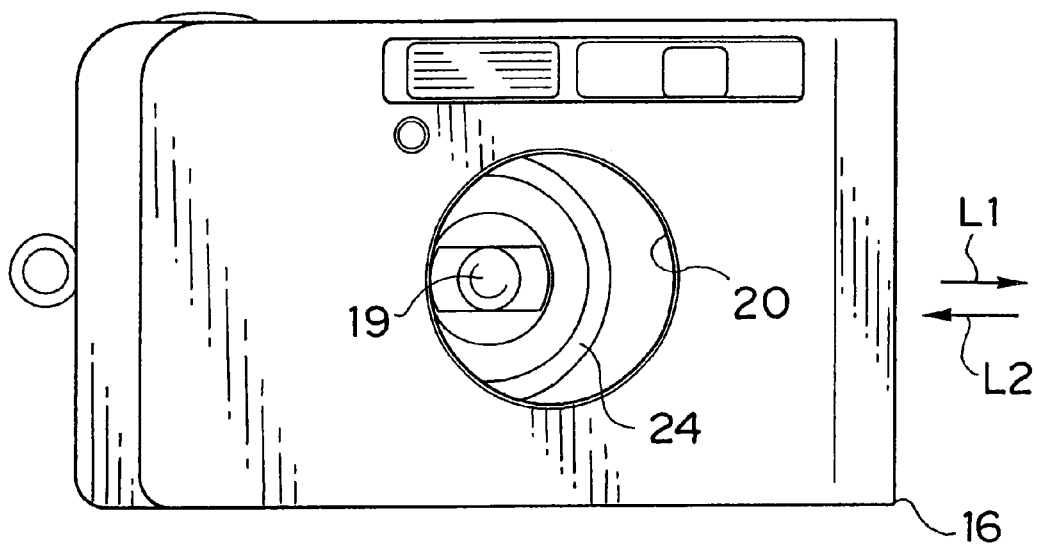
FIG. 6 is a front view showing the rigid cover slid to the end from the state shown in FIG. 5A.
Figure 18:
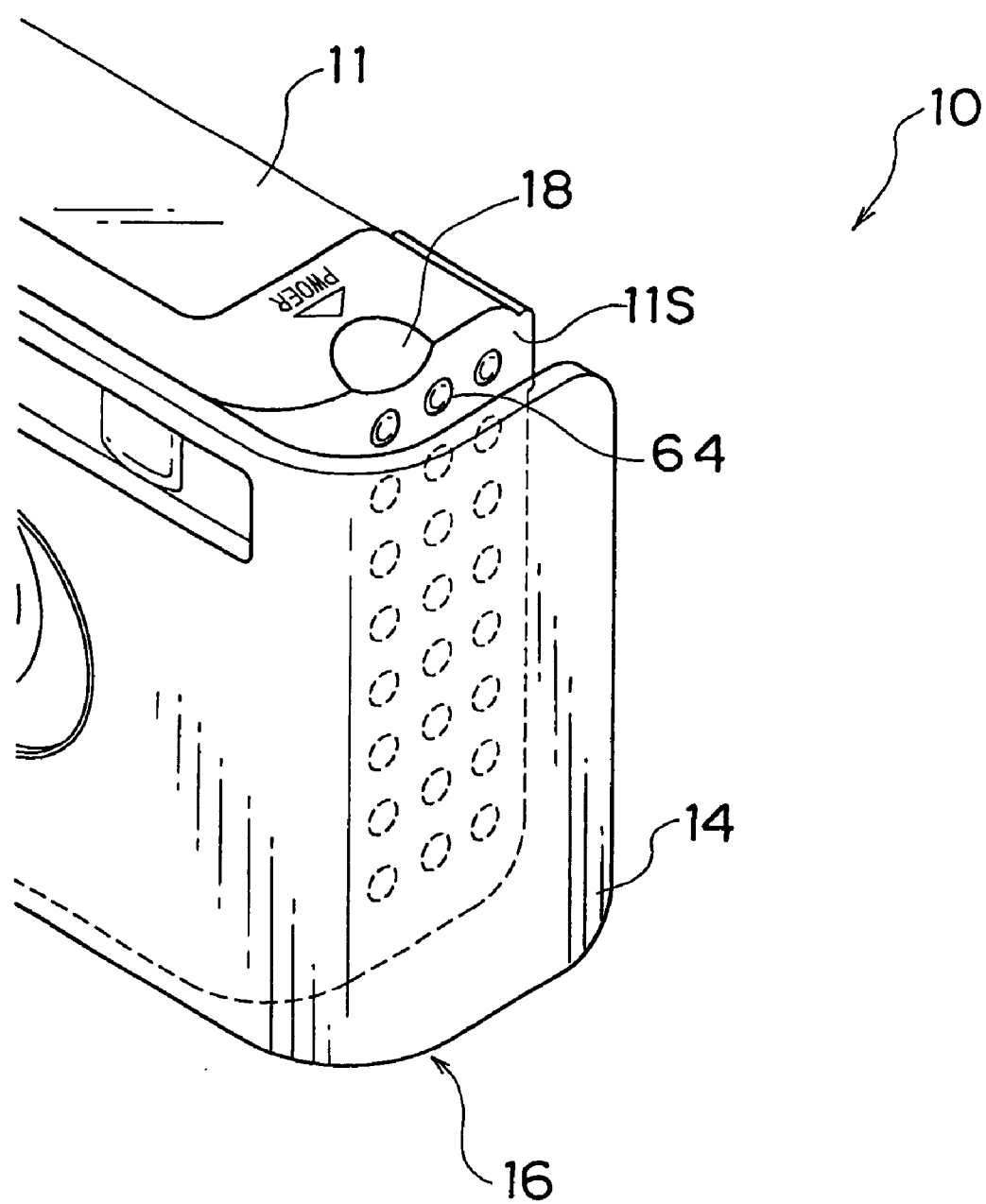
FIG. 18 is a partial perspective view showing a state in which the rigid cover has been slid.

In order to make it easy for a person's left hand to slide the side cover 14, a curved recess 18 for finger placement on the rigid cover 16 is formed in an upper right portion of the camera body 11 when seen from the front (see FIGS. 5B and 18). It should be noted, however, that the position at which the curved recess is disposed is not limited to the upper right portion, and that the curved recess can be disposed in a lower right portion of the camera body 11 in addition to, or in place of, being disposed in the upper right portion.

A display panel 30 (see FIG. 1B) for displaying, as motion images, images to be shot and operational modes of the camera 10 is disposed at the back of the camera 10. Moreover, a ring member 34 to which a strap 32 (see FIG. 1A) is attached is rotatably disposed on the side of the camera 10 not disposed with the side cover 14. A shutter release button 36 is disposed at the top left of the camera body 11 when seen from the front.

(Opening/Closing of the Lens Aperture by Movement of the Rigid Cover)

Prior to the camera 10 being operated, the lens aperture 20 is closed by the lens barrier 26 (see FIG. 1A). The diameter of a lens barrier cap 27 is quite larger than the diameter of the lens aperture 20, and the lens barrier cap 27 is disc-shaped. The lens barrier cap 27 covers the lens aperture 20 when the lens barrier cap 27 is positioned in the position shown in FIG. 1A.

Figure 2:
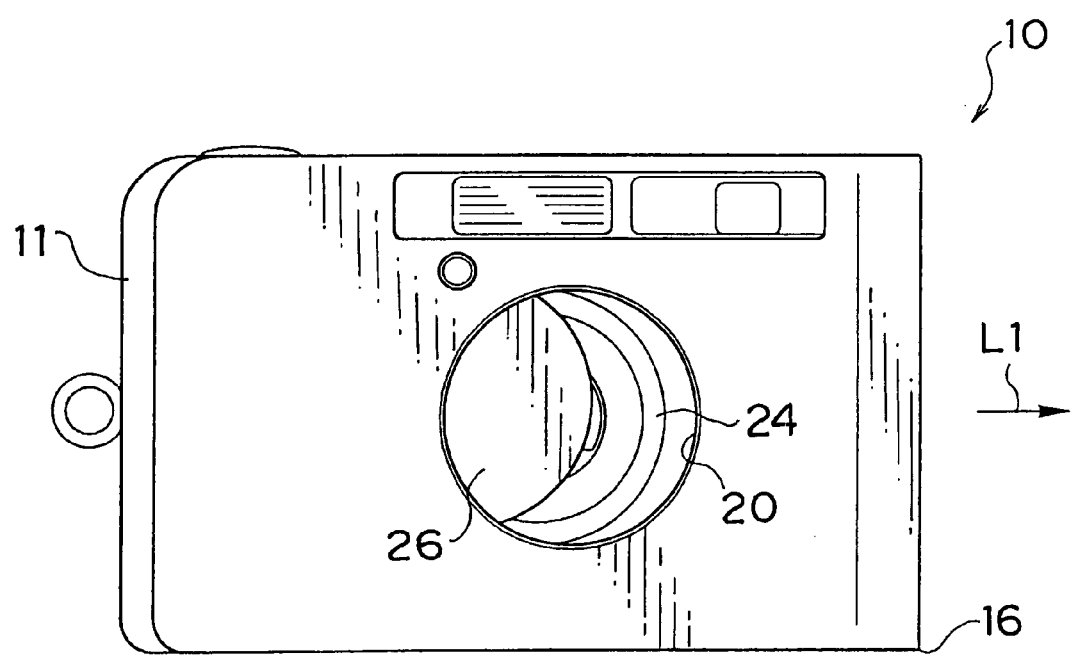
FIG. 2 is a front view showing a lens barrier being opened by sliding a rigid cover from the state shown in FIG. 1A.

When the rigid cover 16 is slid in a transverse direction (i.e., the direction indicated by L1), the lens barrier 26 interlocks with the movement of the rigid cover 16 and begins moving, whereby the lens aperture 20 begins to open (see FIG. 2). When the rigid cover 16 is further moved as far as a position to which it can be slid in the direction of L1 (i.e., to an end), the rigid cover 16 is positioned into a position at which the lens aperture 20 is completely opened (see FIG. 3).

The camera 10 is disposed with an inner frame 40 that is disposed at the inner side of the rigid cover 16 and structures the camera body 11. A support 42 for supporting the lens barrier cap 27 when the lens barrier 26 rotates is disposed at the inner frame 40. The support 42 includes a surface 42S that is formed so that the lens barrier cap 27 rotates smoothly.

Figure 8:
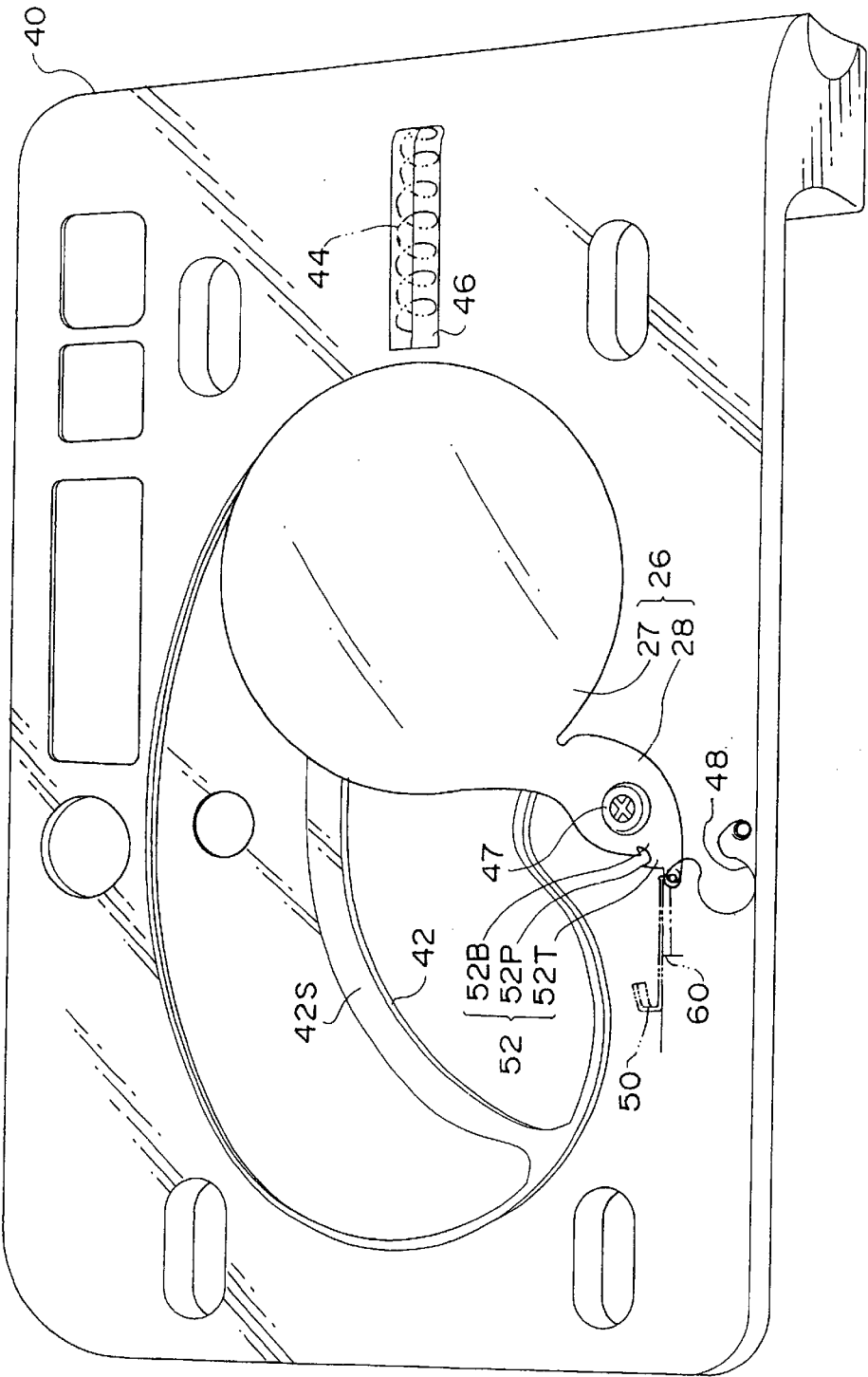
FIG. 8 is a perspective view showing an inner frame that structures a camera body.
Figure 9:
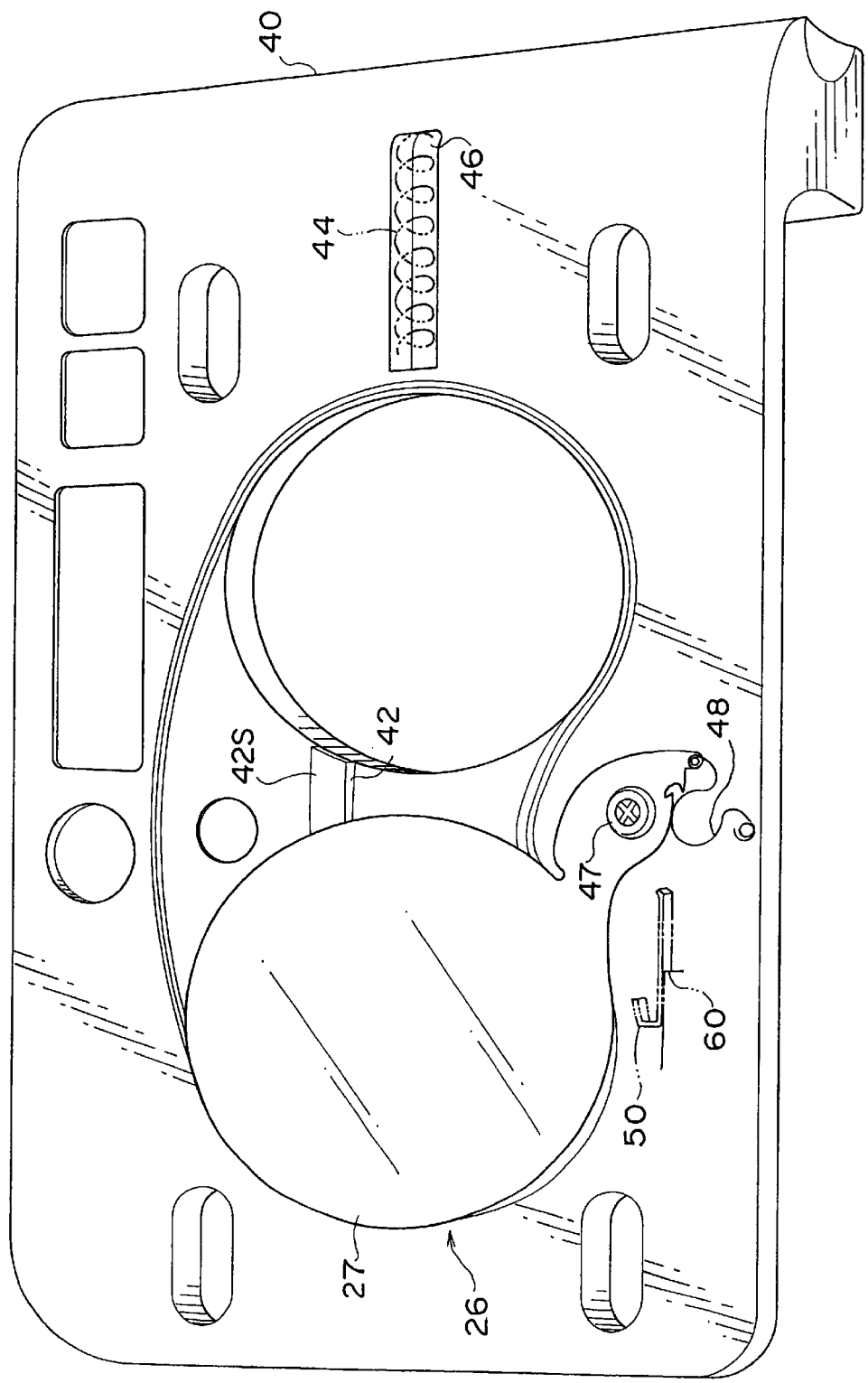
FIG. 9 is a perspective view showing the inner frame that structures the camera body.
Figure 11:
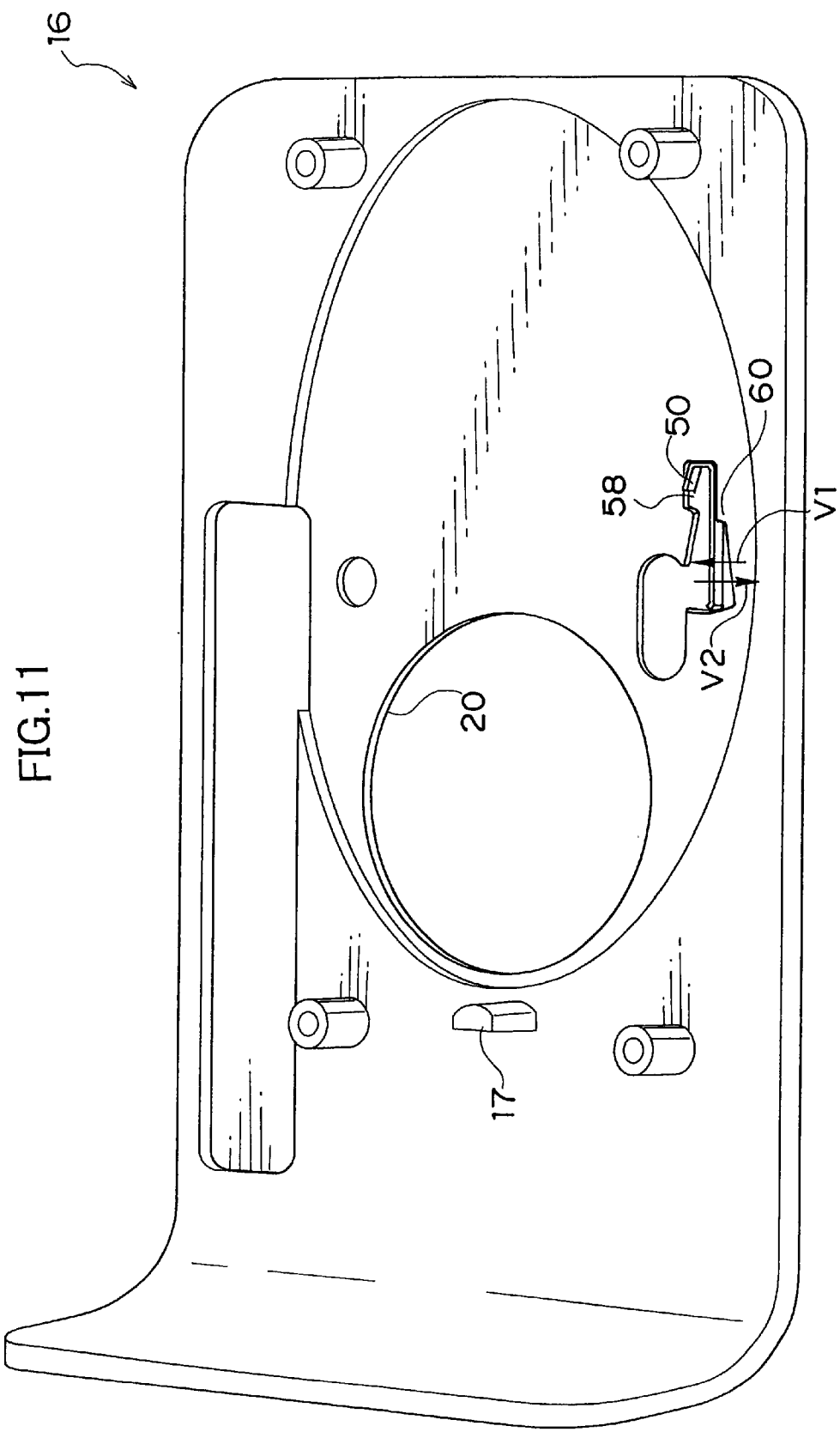
FIG. 11 is a perspective view showing the structure of a reverse surface of the rigid cover.

A protrusion 17 is formed on the inner side of the rigid cover 16 (see FIG. 11). As shown in FIGS. 8 and 9, a groove 46 disposed with a compression coil spring 44 is formed in the inner frame 40. The inner side of the rigid cover 16 faces the front (surface) of the inner frame 40. The position of the protrusion 17 corresponds to the position of the compression coil spring 44 mounted in the groove 46, and the compression coil spring 44 exerts an urging force on the protrusion 17. Thus, the rigid cover 16 is always urged to return to its former position by the compression coil spring 44 when the rigid cover 16 is slid.

Figure 3:
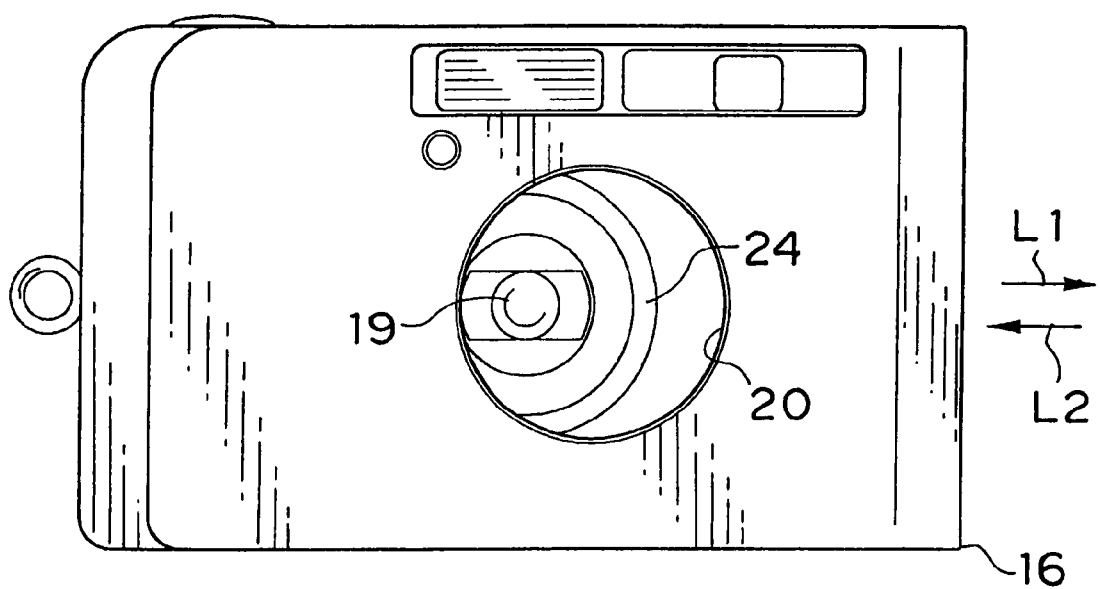
FIG. 3 is a front view showing the lens barrier moved to completely open a lens aperture by the rigid cover having been moved to an end.
Figure 4:
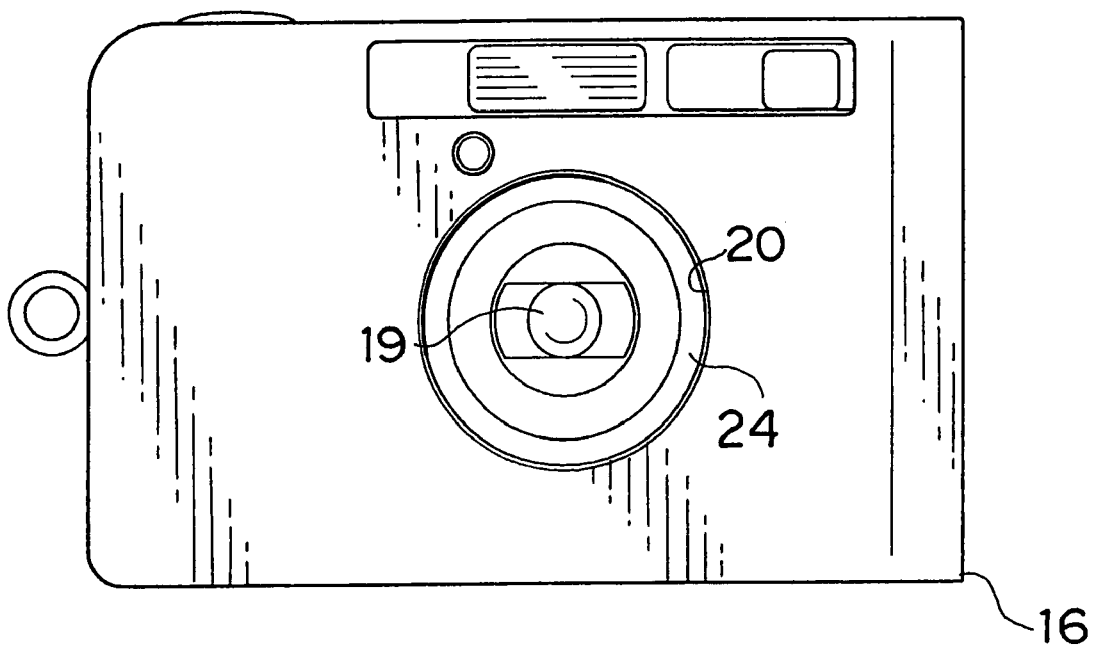
FIG. 4 is a front view showing the rigid cover returned to its former position by the rigid cover being released from one's hand in the state shown in FIG. 3.

Accordingly, when the rigid cover 16 is released from one's hand in the state shown in FIG. 3, the rigid cover 16 slides in the direction of L2 and returns to its former position, as shown in FIG. 4. At this time, the lens barrier 26 does not move and the lens aperture 20 remains open.

Next, the lens barrel 24 is made to extend from the camera body 11 by an unillustrated extension mechanism and, as shown in FIG. 5A, it becomes possible for the camera 10 to shoot.

When a push-button 13 (see FIG. 1B) disposed on the back of the camera 10 is pushed after shooting has been concluded, the lens barrel 24 is accommodated in the camera body 11 by the extension mechanism.

It should be noted that the shape of the lens aperture 20 can also be a long oval in the camera side direction, so that when the rigid cover 16 is slid in a state in which the lens barrel 24 has emerged from the lens aperture 20, a switch is actuated and the lens barrel 24 is automatically accommodated. In this case, it becomes unnecessary to dispose the push-button 13 on the back of the camera 10, whereby the ease with which the camera can be operated is further improved.

Figure 7:
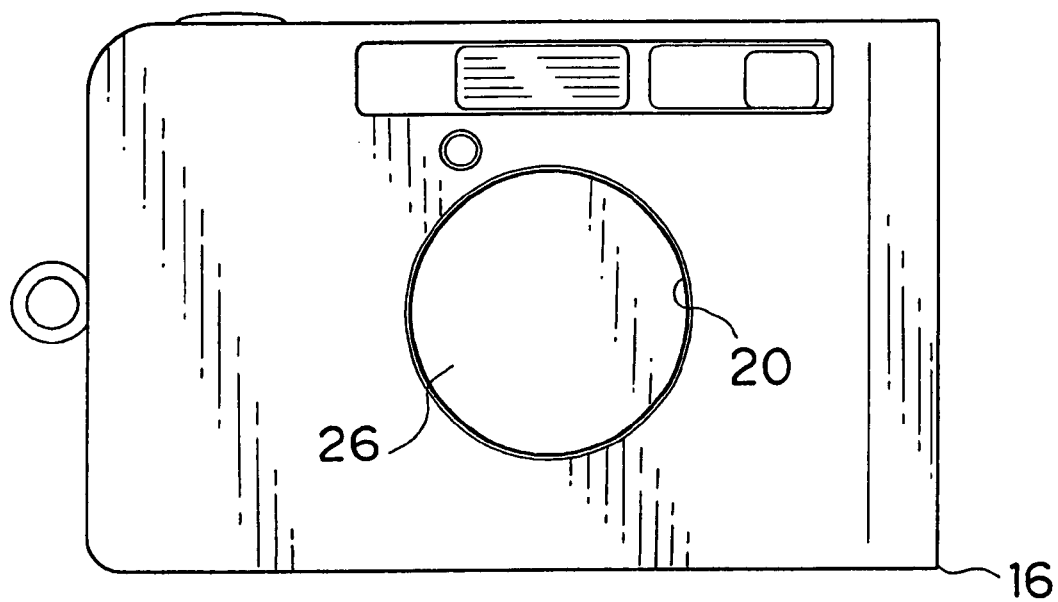
FIG. 7 is a front view showing the rigid cover returned to its former position by the rigid cover being released from one's hand in the state shown in FIG. 6, and the lens barrier having slid to close the lens aperture.

When the rigid cover 16 is again slid in the direction of L1 (see FIG. 6) and released from one's hand after the lens barrel 24 has been completely accommodated, the rigid cover 16 returns to its former position, whereby the lens barrier 26 is moved and the lens aperture 20 is closed (see FIG. 7).

(Lens Barrier Opening/Closing Switching Mechanism)

Description will now be given of a mechanism by which the lens barrier 26 opens and closes the lens aperture 20. As shown in FIG. 8, the lens barrier 26 is rotatably mounted on the front of the inner frame 40.

The lens barrier 26 comprises the lens barrier cap 27 and a transmitting member 28 through which rotational force is transmitted. The transmitting member 28 extends from the lens barrier cap 27 and is rotatably held at a rotating shaft 47.

A receiving portion 52 for receiving a moving force from a flexible pin 50 attached to the inner side of the rigid cover 16 is formed in the transmitting member 28.

A projection 52P, against which a pin tip 50T collides when the pin 50 is moved, is formed at the receiving portion 52. One end of a toggle spring 48 is attached to a receiving tip 52T which composes a tip side that is disposed more distally than the projection 52P. The other end of the toggle spring 48 is attached to the front surface of the inner frame 40.

Figure 12:
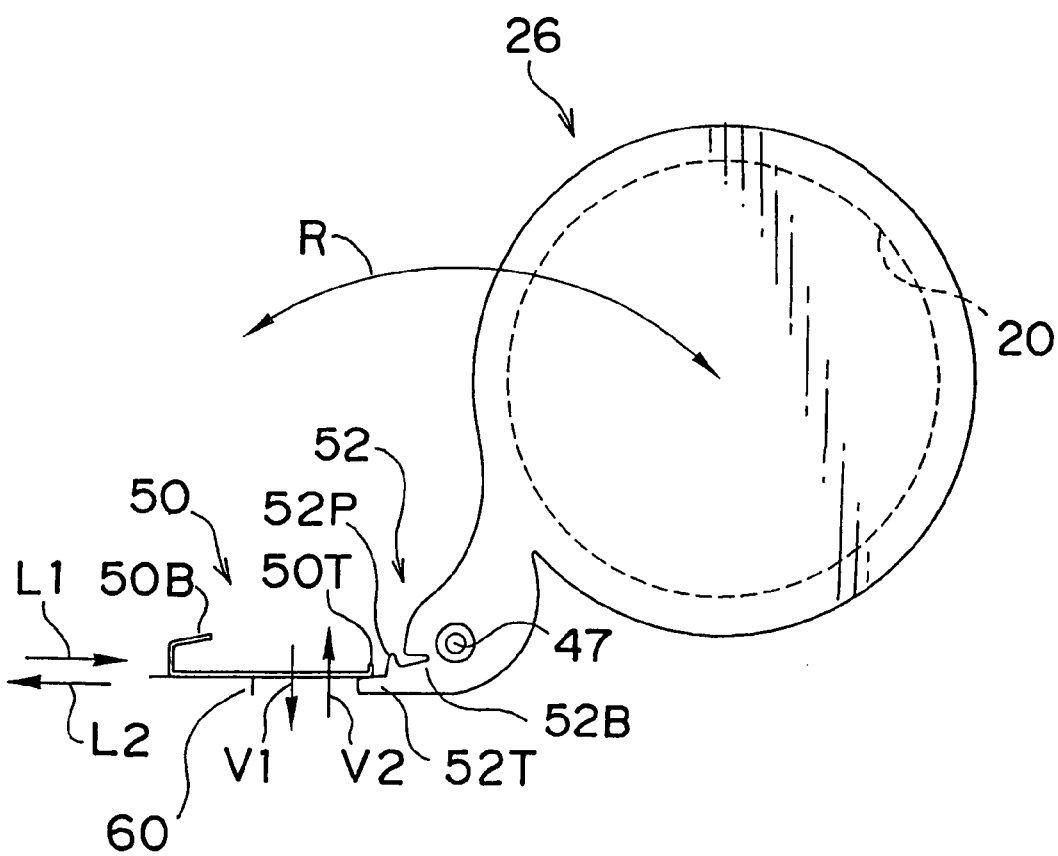
FIG. 12 is a schematic front view showing the lens barrier positioned in a closed state when the camera is ordinarily stored.
Figure 13:
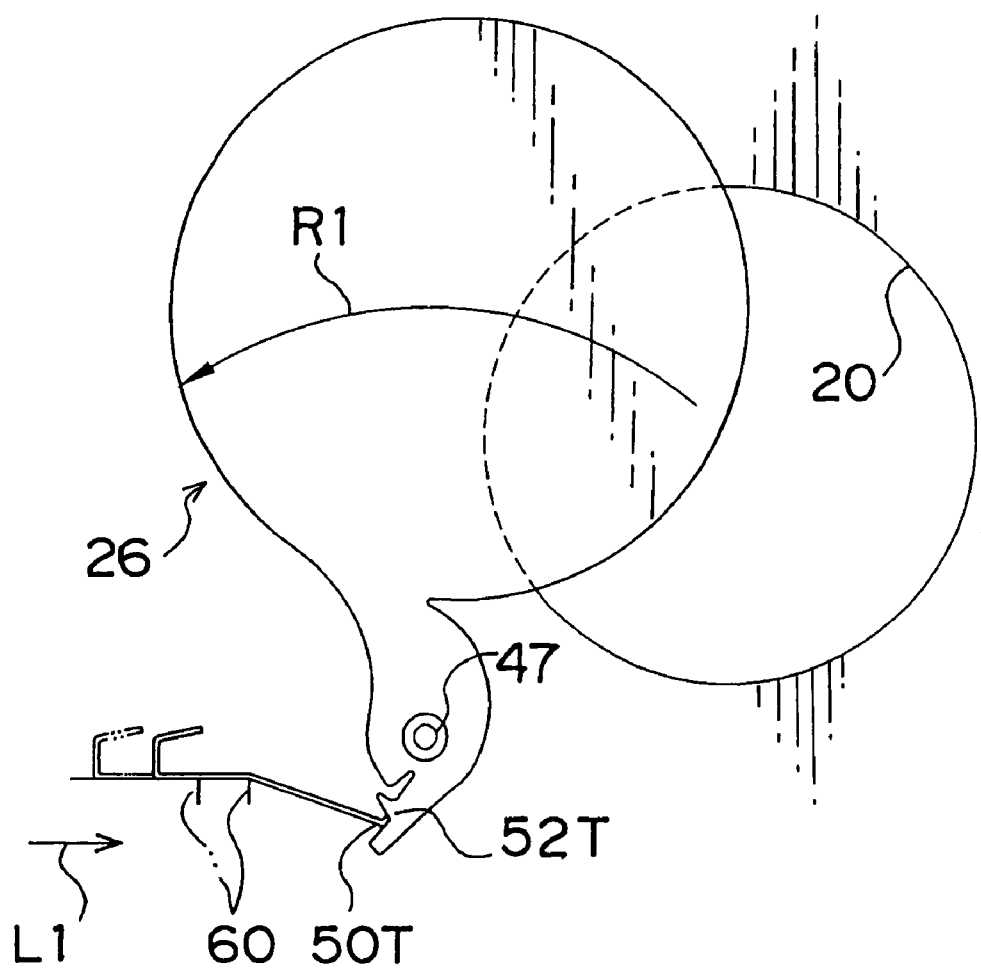
FIG. 13 is a schematic front view showing the lens aperture being opened by movement of a pin due to movement of the lens barrier.
Figure 14:
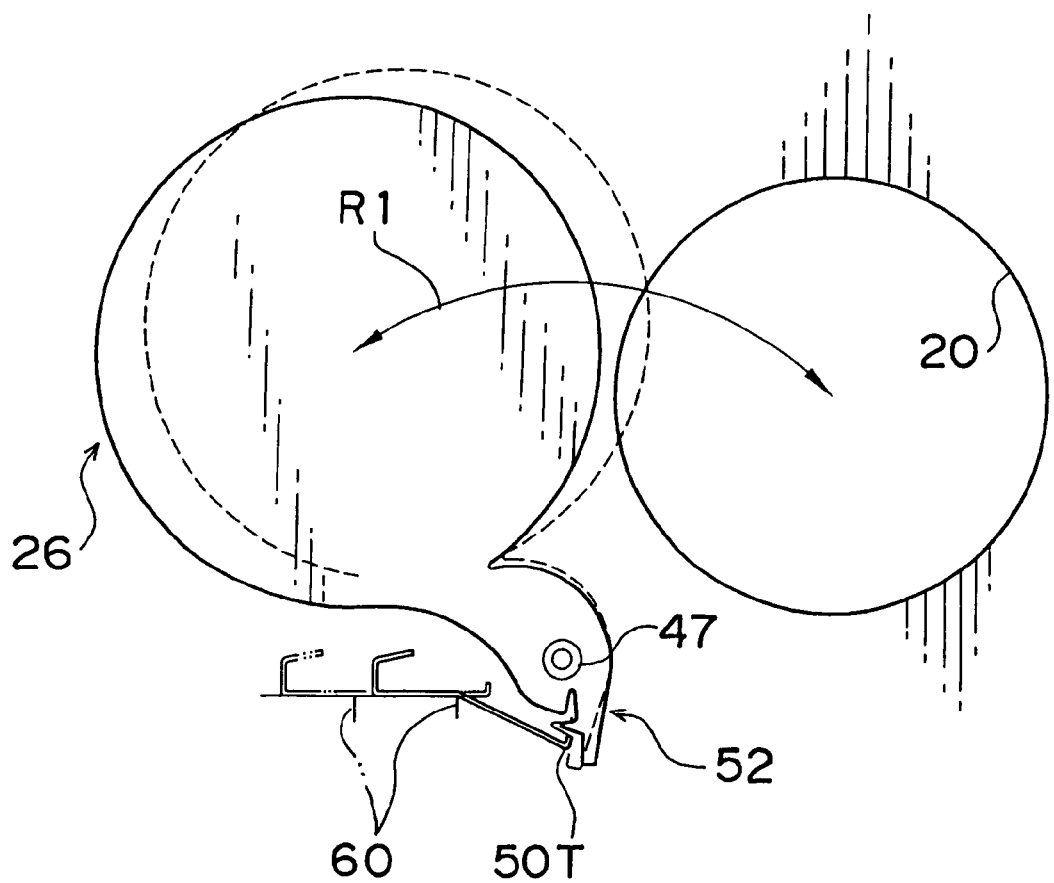
FIG. 14 is a schematic front view showing the lens aperture having been completely opened by movement of the pin due to movement of the lens barrier.
Figure 15:
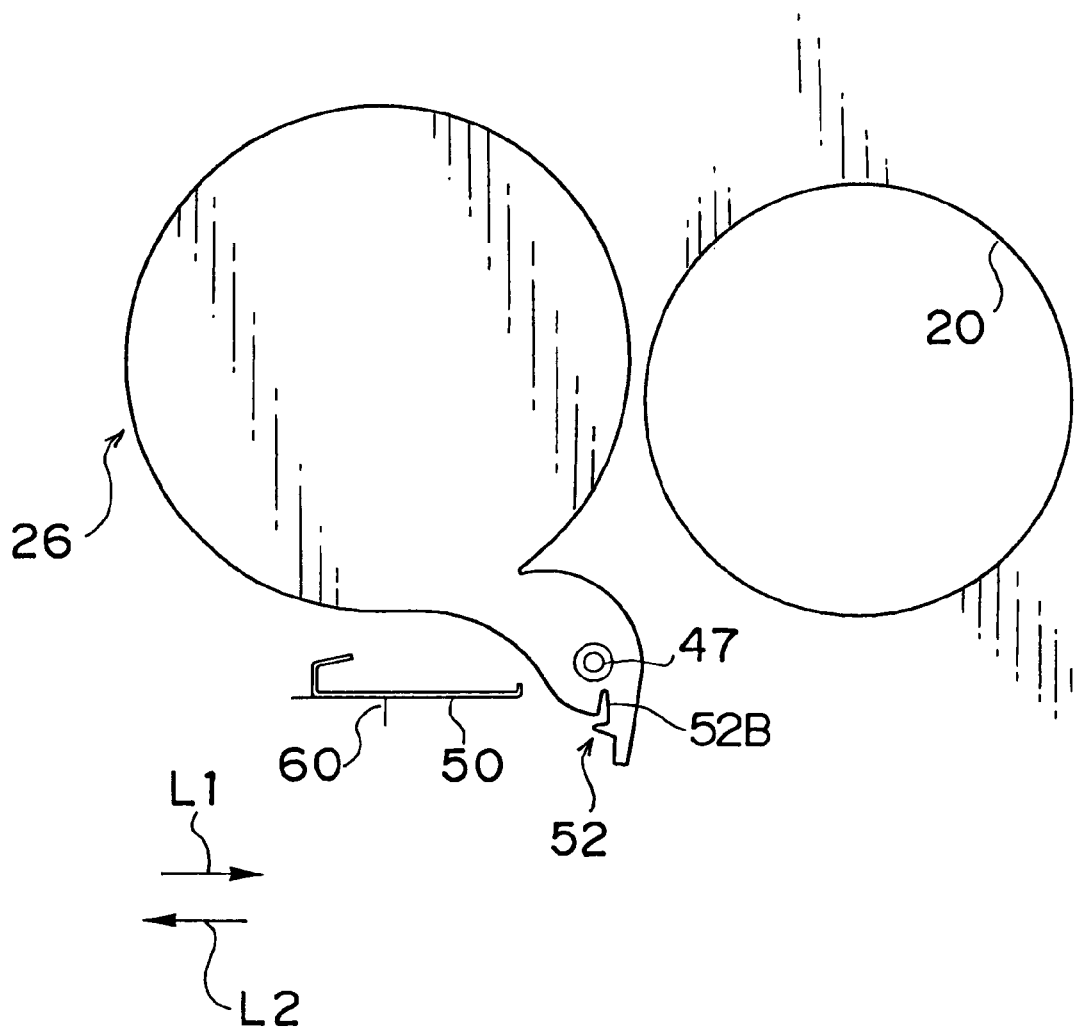
FIG. 15 is a schematic front view showing the pin returned to its former position by the rigid cover returning to its former position from the state shown in FIG. 14.
Figure 16:
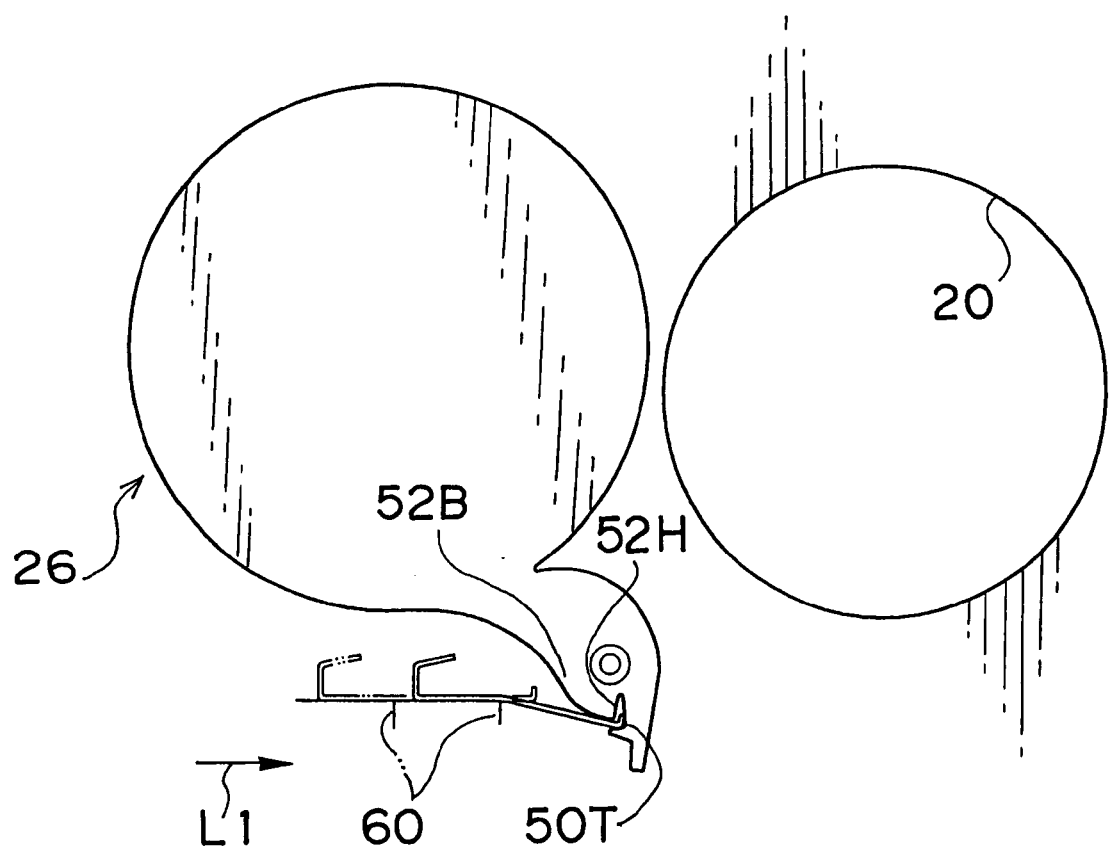
FIG. 16 is a schematic front view showing a tip of the pin engaging with a base end of the lens barrier due to the rigid cover being moved to the end from the state shown in FIG. 15.
Figure 17:
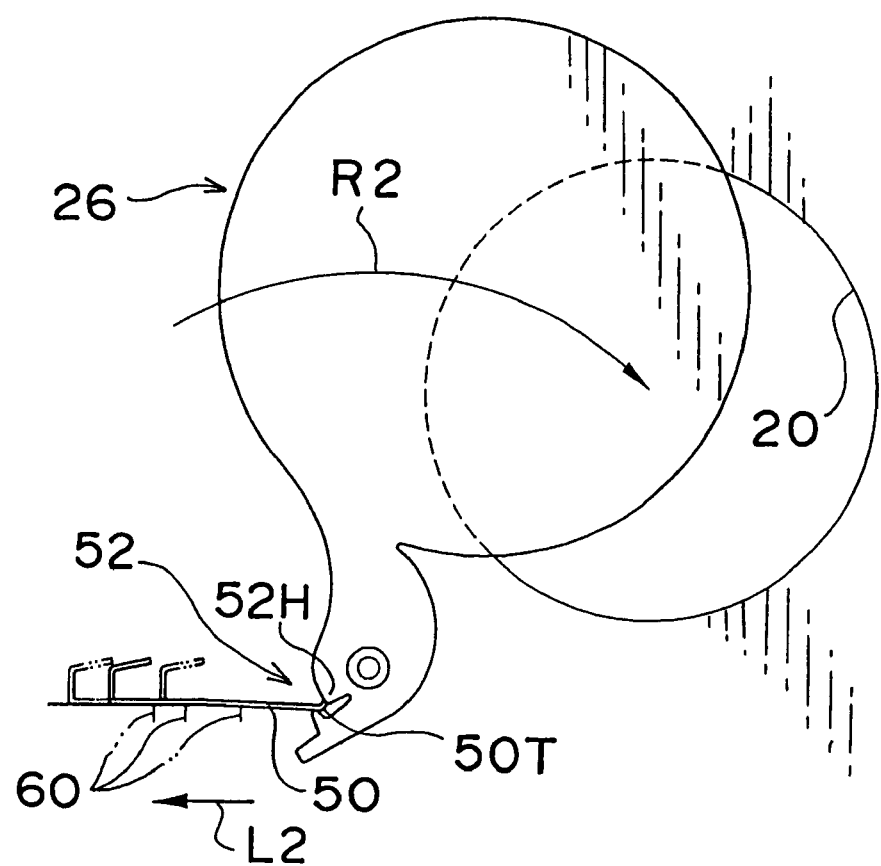
FIG. 17 is a schematic front view showing the lens barrier moving to a closed position by the rigid cover being released from one's hand in the state shown in FIG. 16.

As shown in FIGS. 12 through 14, when the pin tip 50T moves along the receiving tip 52T and collides with the projection 52P, the lens barrier 26 rotates and the lens aperture 20 opens. As shown in FIGS. 15 through 17, when the pin tip 50T enters a receiving base end 52B that is nearer a base end (i.e., the rotating shaft 47) than the projection 52P, the lens barrier 26 moves and the lens aperture 20 closes.

A recess 58 into which the pin 50 fits is formed in the inner side of the rigid cover 16. The pin tip 50T is slightly bent in a substantial L-shape and serves as an engaging portion that engages with the receiving portion 52. Moreover, a pin base end 50B is processed into a general U-shape so as to be fitted into the recess 58. As shown in FIG. 11, it is also possible to bend the portion extending from the pin base end 50B towards the top of the camera, i.e., in the direction of V1 (see FIG. 1), and towards the bottom of the camera, i.e., in the direction of V2.

By sliding the rigid cover 16 in the direction of L1 (see FIG. 1), the pin 50 moves in the direction of L1 as shown in FIG. 12, and by returning the rigid cover 16 to its former position, the pin 50 moves in the direction of L2. Namely, by reciprocating the rigid cover 16, the pin 50 is also reciprocated.

When the rigid cover 16 is moved in the direction of L1 from a state in which the lens aperture 20 is closed by the lens barrier 26 (i.e., from the state shown in FIG. 12), the pin tip SOT moves along the receiving tip 52T and collides with the projection 52P. When the rigid cover 16 is further moved in the direction of L1, the pin tip 50T pushes the projection 52P. As a result, the lens barrier 26 rotates in the direction of R1 as shown in FIG. 13.

When the rigid cover 16 is further moved in the direction of L1, the lens barrier 26 is further rotated in the direction of R1, as indicated by the broken line in FIG. 14, and the lens barrier 26 begins to be urged in the direction of R1 by the toggle spring 48. As a result, the receiving portion 52 moves away from the pin tip 50T and the lens barrier 26 rotates as far as a position to which it is rotatable, whereby the rotation stops, as indicated by the solid line in FIG. 14. In this state, the lens aperture 20 is completely opened.

Figure 10A:
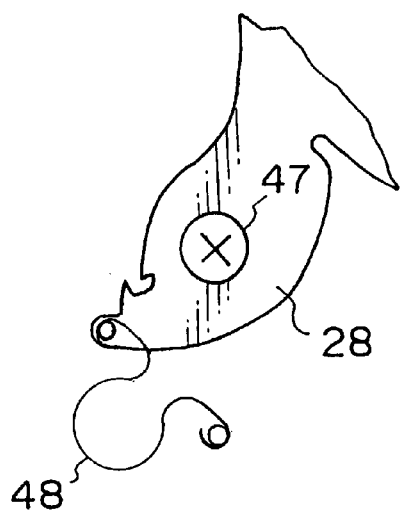
FIGS. 10A to 10C are schematic partial enlarged front views showing how the shape and position of a toggle spring change when the lens barrier is moved and the lens aperture is opened.
Figure 10B:
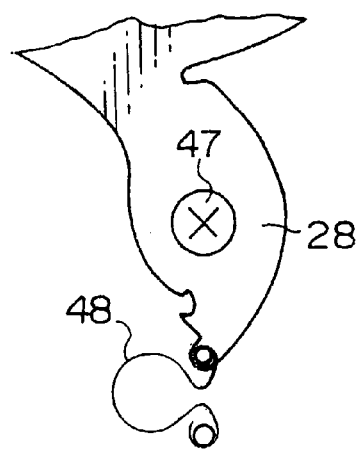
Figure 10C:
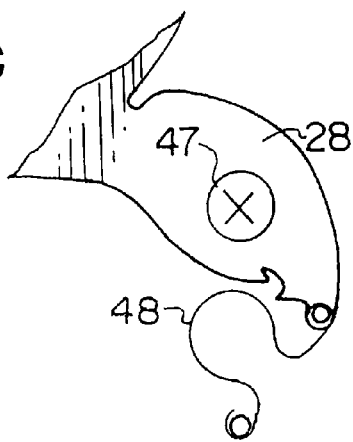

FIGS. 10A through 10C illustrate how the shape and position of the toggle spring 48 change when the lens barrier 26 is moved and the lens aperture 20 is opened.

When the rigid cover 16 is released from one's hand, the rigid cover 16 moves in the direction of L2 and returns to its former position. Because the pin tip 50T is not engaged with the receiving portion 52 of the lens barrier 26, the pin 50 returns to its former position while the lens aperture 20 is maintained in an open state, as shown in FIG. 15.

In order to move the lens barrier 26 to close the lens aperture 20 when shooting has been concluded, the rigid cover 16 is again slid in the direction of L1. As a result, the pin tip 50T crosses over a catch 52H that forms the receiving base end 52B, as shown in FIG. 16.

When the rigid cover 16 is released from one's hand, the rigid cover 16 begins to return to its former position. As a result, because the pin 50 moves in the direction of L2 and begins to return to its former position, the pin tip 50T is caught on the catch 52H as shown in FIG. 17. Thus, because the receiving portion 52 is pulled in the direction of L2, the lens barrier 26 rotates in the direction of R2.

When the rigid cover 16 is further moved in the direction of L2, the lens barrier 26 is further rotated in the direction of R2 and begins to be urged in the direction of R2 by the toggle spring 48. Further, the pin tip 50T moves away from the catch 52H and the lens barrier 26 rotates as far as an end position to which it is rotatable, whereby the rotation stops, as shown in FIG. 12. In this state, the lens aperture 20 is completely closed by the lens barrier 26.

As described above, in the present embodiment, the lens barrier 26 can be made to open and close by sliding the rigid cover 16.

Moreover, the lens barrier 26 is rotatably supported at the rotating shaft 47, and the lens barrier cap 27 is moved a lot by the transmitting member 28 of the lens barrier 26 moving a little, whereby the lens aperture 20 is opened and closed. Accordingly, it is possible to sufficiently move the lens barrier 26 by slightly sliding the rigid cover 16 for opening/closing.

Additionally, because the front cover 12 can easily be slid while holding the camera 10 in one hand, the operation by which the lens aperture 20 is opened and closed by the lens barrier 26 is remarkably easy.

It should be noted that, as shown in FIG. 18, LEDs 64 can be arranged on a side 11S of the camera body 11 facing the inner side of the side cover 14, so that the LEDs 64 emits light when the rigid cover 16 is slid and the side cover 14 is moved away from the side 11S. In this case, it is possible for an operator to be easily notified that the rigid cover 16 has been moved, even when it is dark (e.g., at night). A camera that also has an appealing design is also realized.

Second Embodiment

A second embodiment of the invention will now be described. In the second embodiment, constituent elements that are the same as those described in the first embodiment will be indicated by the same reference numerals and described thereof will be omitted.

Figure 19:
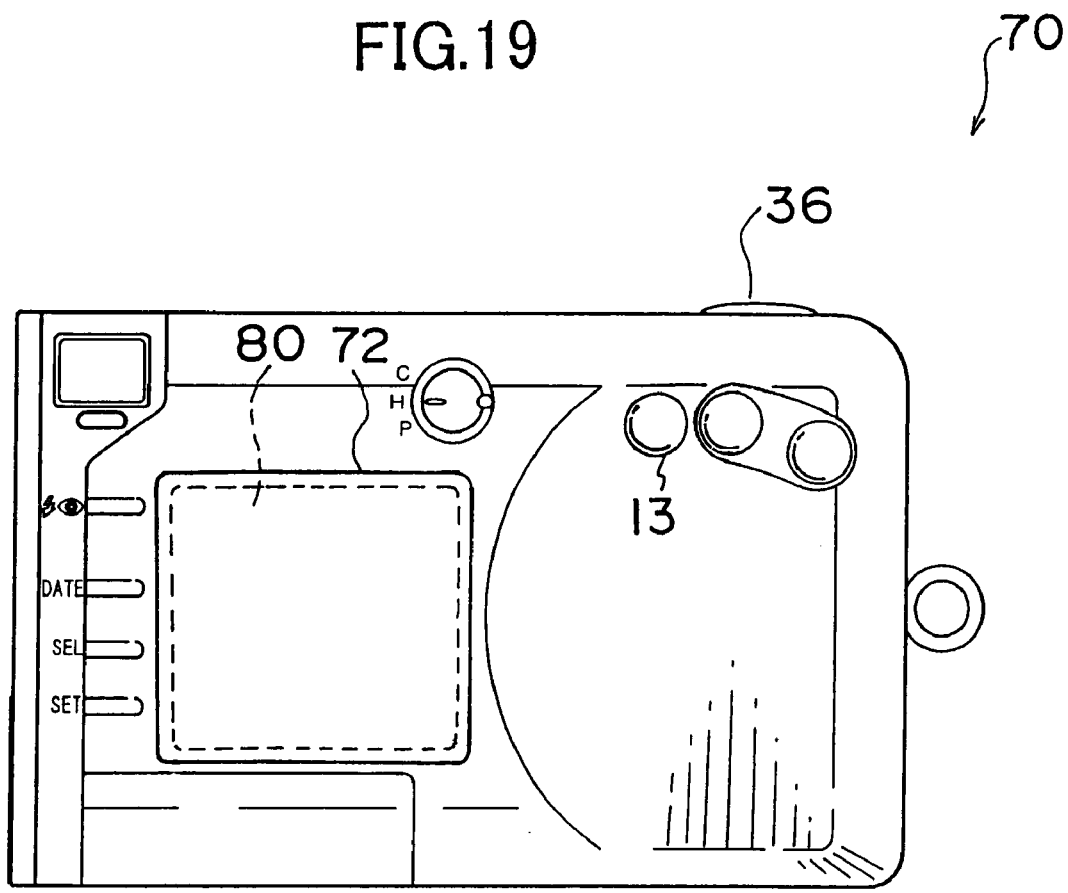
FIG. 19 is a rear view showing a state in which an open/close cover is closed in a second embodiment of the invention.
Figure 20:
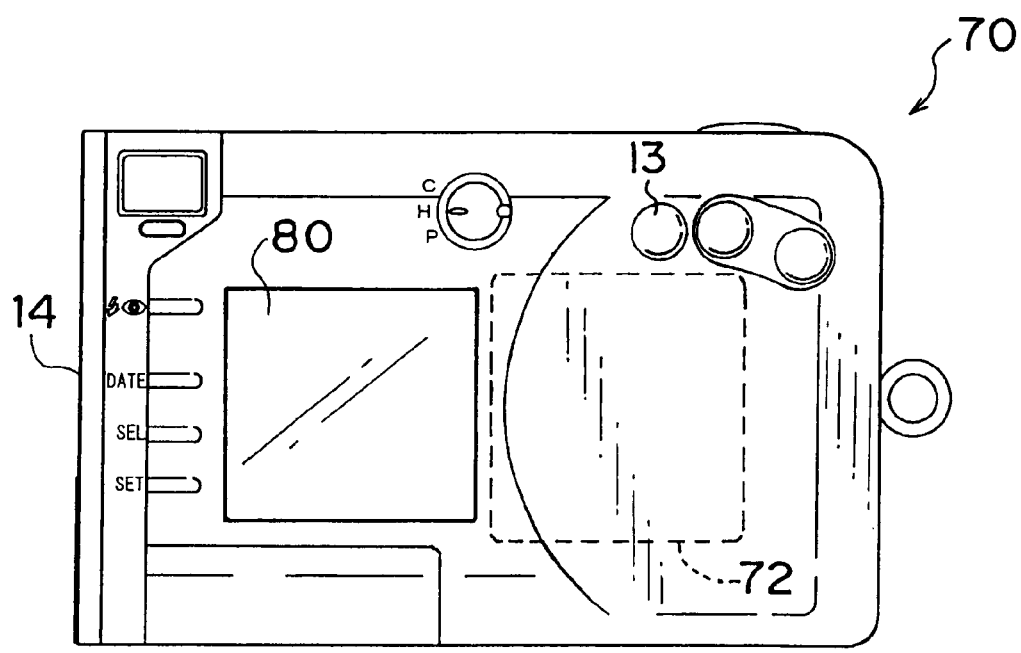
FIG. 20 is a rear view showing a state in which the open/close cover is opened in the second embodiment.

As shown in FIGS. 19 and 20, in a camera 70 according to the second embodiment, the lens barrier 26 interlocks with the sliding of the rigid cover 16 to open and close the lens aperture 20. Additionally, a display panel 80 is opened and closed by sliding an open/close cover 72 disposed at the back surface.

Thus, because it is possible to protect the display panel 80 with the open/close cover 72, there is no potential for the display panel 80 to sustain impact when the camera 70 is carried around. Accordingly, the display panel 80 can be protected without having to raise the durability of the display panel 80.

Although the invention has been described with reference to the preceding embodiments, the scope of the invention is not limited to the preceding embodiments.

What is claimed is:

1. A camera comprising:

a front cover that is disposed at a lens-mounted side of the camera, so as to be slidable with respect to a camera body mounted with the lens, and includes a lens aperture which exposes the lens;

a movable lens barrier that can be moved between a cover position in which lens barrier covers the lens aperture and an uncover position in which the lens barrier exposes the lens aperture; and an opening/closing mechanism which moves the lens barrier interlockingly with a sliding movement of the front cover so that a reciprocal movement of the front cover away from a first position and back to the first position initiated while the lens barrier is in the cover position will perform opening of the lens aperture by moving the lens barrier to the uncover position and leaving the lens barrier in the uncover position, and wherein the reciprocal movement of the front cover initiated while the lens barrier is in the uncover position will perform closure of the lens aperture by moving the lens barrier to the cover position and leaving the lens barrier in the cover position.

2. The camera of claim 1, wherein the opening/closing mechanism comprises a switching mechanism which switches between said opening and closure of the lens aperture by the lens barrier for successive said reciprocal movements of the front cover.

3. The camera of claim 2, wherein the switching mechanism retains the lens barrier at a position in which the lens barrier is left at a conclusion of the reciprocal movement.

4. The camera of claim 1, wherein the lens barrier is rotatably disposed at a front side of the camera body and rotates interlockingly with a sliding movement of the front cover in one direction.

5. The camera of claim 1, further including an urging member which urges the front cover in a constant direction.

6. The camera of claim 1, wherein the diameter of the lens aperture is larger than an outside diameter of a lens barrel housed in the camera body.

7. The camera of claim 6, further including an extension mechanism which extends the lens barrel from the camera body.

8. The camera of claim 1, wherein the front cover is slidable in a side direction relative to the camera body.

9. The camera of claim 8, further including a side cover having a side that is integrally formed with the front cover so as to form a substantially L-shaped cover when the camera is viewed from above.

10. The camera of claim 9, wherein a recess, into which a finger can be placed when the substantially L-shaped cover is slid, is formed in the camera body, and the finger catches the substantially L-shaped cover when the finger is placed in the recess.

11. The camera of claim 9, wherein the camera has a shape in which a step is formed at a portion between the substantially L-shaped cover and the camera body.

12. The camera of claim 11, wherein the shape is a recess formed in the camera body.

13. The camera of claim 1, further comprising:
a display device disposed at a back surface of the camera body; and
an open/close cover which opens and closes the display device interlockingly with a sliding movement of the front cover.

14. A method for opening and closing a lens mounted in a camera, the method comprising:
disposing a front cover, in which a lens aperture which exposes the lens is formed, at the lens-mounted side of the camera so as to be slidable with respect to a camera body; and
opening the lens aperture with a lens barrier by moving the lens barrier interlockingly with a reciprocal sliding movement of the front cover by sliding the front cover away from a first position and then back to the first position; and
closing the lens aperture with the lens barrier by again moving the lens barrier interlockingly with the reciprocal sliding movement of the front cover by sliding the front cover away from the first position and then back to the first position.

15. The method of claim 14, wherein the lens barrier is retained at the position at which the lens aperture is opened after the opening step until the closing step.

16. A camera comprising:
a front cover that is disposed at a lens-mounted side of the camera, so as to be slidable with respect to a camera body mounted with the lens, and includes a lens aperture which exposes the lens;
a movable member that can be moved between a cover position in which the member covers the lens aperture and an uncover position in which the member exposes the lens aperture; and
an opening/closing mechanism which moves the member interlockingly with a sliding movement of the front cover so that a reciprocal movement of the front cover away from a first position and back to the first position initiated while the member is in the cover position will perform opening of the lens aperture by moving the member to the uncover position and leaving the member in the uncover position, and wherein the reciprocal movement of the front cover initiated while the member is in the uncover position will perform closure of the lens aperture by moving the member to the cover position and leaving the member in the cover position.

17. The camera of claim 16, wherein the opening/closing mechanism comprises a switching mechanism which switches between said opening and closure of the lens aperture by the member for successive said reciprocal movements of the front cover.

* * * * *